(12) United States Patent
Tong et al.

(10) Patent No.: US 11,989,090 B2
(45) Date of Patent: May 21, 2024

(54) METHOD AND SYSTEM FOR ENSURING FAILURE ATOMICITY IN NON-VOLATILE MEMORY

(71) Applicant: HUAZHONG UNIVERSITY OF SCIENCE AND TECHNOLOGY, Hubei (CN)

(72) Inventors: Wei Tong, Hubei (CN); Dan Feng, Hubei (CN); Jingning Liu, Hubei (CN); Xueliang Wei, Hubei (CN); Weilin Zhu, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 112 days.

(21) Appl. No.: 17/763,926

(22) PCT Filed: Jun. 16, 2020

(86) PCT No.: PCT/CN2020/096295
§ 371 (c)(1),
(2) Date: Mar. 25, 2022

(87) PCT Pub. No.: WO2021/227188
PCT Pub. Date: Nov. 18, 2021

(65) Prior Publication Data
US 2022/0334918 A1 Oct. 20, 2022

(30) Foreign Application Priority Data
May 14, 2020 (CN) .......................... 202010407572.7

(51) Int. Cl.
*G06F 16/00* (2019.01)
*G06F 9/46* (2006.01)
(Continued)

(52) U.S. Cl.
CPC .......... *G06F 11/1064* (2013.01); *G06F 9/466* (2013.01); *G06F 11/0772* (2013.01); *G06F 11/0778* (2013.01); *G06F 11/1471* (2013.01)

(58) Field of Classification Search
None
See application file for complete search history.

(56) References Cited

U.S. PATENT DOCUMENTS

2016/0350216 A1   12/2016   Shu et al.
2019/0004851 A1*   1/2019   Doshi ................. G06F 9/30072
2019/0129716 A1*   5/2019   Calciu ................. G06F 11/1471

FOREIGN PATENT DOCUMENTS

CN   103488549 A   1/2014
CN   106030534 A   10/2016
(Continued)

OTHER PUBLICATIONS

International Search Report (with English translation) and Written Opinion issued in PCT/CN2020/096295, dated Feb. 18, 2021, 10 pages provided.

(Continued)

*Primary Examiner* — Anhtai V Tran
(74) *Attorney, Agent, or Firm* — Hamre, Schumann, Mueller & Larson, P.C.

(57) ABSTRACT

Disclosed in the present invention are a method and a system for ensuring the failure atomicity in a non-volatile memory, which belong to the field of computer storage. The method comprises: executing transactions encapsulated by one or more operations that need to ensure the failure atomicity in accordance with the following steps: executing operations in a current transaction in sequence, for each write operation in the current transaction, determining whether the oldest value of its corresponding data is saved into a log of the non-volatile memory, if so, then creating an UndoRedo log entry for it, otherwise creating a Redo log entry for it; using (Continued)

corresponding log management strategies according to types of log entries; after all operations are executed, committing the current transaction; and completing the execution of the current transaction; wherein information recorded in the UndoRedo log entries comprises: transaction number, write operation address, and oldest value and new value of corresponding data; and information recorded in the Redo log entries comprises: transaction number, write operation address, and new value of corresponding data. The present invention can reduce the overhead caused by ensuring the failure atomicity in the NVMM.

8 Claims, 6 Drawing Sheets

(51) Int. Cl.
*G06F 11/07* (2006.01)
*G06F 11/10* (2006.01)
*G06F 11/14* (2006.01)

(56) References Cited

FOREIGN PATENT DOCUMENTS

| | | |
|---|---|---|
| CN | 109460318 A | 3/2019 |
| CN | 110515705 A | 11/2019 |

OTHER PUBLICATIONS

Xu et al., Improving Performance of TLC RRAM with Compression-Ratio-Aware Data Encoding', 2017 IEEE 35th International Conference on Computer Design.

Ogleari et al., "Steal but No Force: Efficient Hardware Undo plus Redo Logging for Persistent Memory Systems", 2018 IEEE International Symposium on High Performance Computer Architecture.

* cited by examiner

METHOD AND SYSTEM FOR ENSURING FAILURE ATOMICITY IN NON-VOLATILE MEMORY

FIELD OF THE INVENTION

The present invention belongs to the field of computer storage, and more particularly, relates to a method and system for ensuring the failure atomicity in a non-volatile memory.

BACKGROUND OF THE INVENTION

In the past few decades, Dynamic Random Access Memories (DRAMs) have been widely used in computer systems as main memories. However, in recent years, due to the limitations of refresh power consumption, process size and so on, the development of DRAMs has encountered a bottleneck, and they have gradually been unable to meet the memory requirements of current computer systems. However, the emergence of a new type of non-volatile memories (NVMs) provides new possibilities for the development of memories. Typical NVMs comprise Phase Change Memories (PCM), Spin Transfer Torque Random Access Memories (STT-RAMs), Resistive Random Access Memories (RRAMs), and so on. These NVMs are regarded as one of the most potential DRAM replacements due to their DRAM-like performance, low power consumption, byte addressability and other characteristics. In addition, the NVMs are also non-volatile, that is, no data is lost when the power is off. Therefore, the NVMs are also called non-volatile main memories (NVMMs) when they are used as main memories. The NVMMs allow applications to access persistent data by means of high-speed memory interfaces, avoiding the need to read data from external storage devices such as disks and solid-state drives through low-speed I/O operations.

While the NVMMs bring new possibilities to the development of memory systems, they also bring new challenges to the design of memory systems. One of the most important challenges is to provide efficient failure atomicity support for NVMM write operations. This is because unexpected system failures (such as power-off, crash, etc.) can interrupt the currently executing write operation, so that data stored in the NVMMs is in an incompletely updated state, resulting in data corruption or loss. The failure atomicity ensures that after a system failure, the data in the NVMMs can be recovered to a state that has not been updated or has been completely updated.

In order to provide failure atomicity support, existing methods wrap a set of write operations into a transaction, and ensure the failure atomicity of the transaction by means of a log. The basic idea of the log is to first save the data corresponding to a write operation to a log area applied for in the NVMMs, and then perform the write operation to update the data in the NVMMs. When a system failure occurs, the log can be used to recover the data in the NVMMs to the state that has not been updated or has been completely updated. According to the execution modes of log operations (such as log creation, storage, etc.), the methods for providing failure atomicity support can be divided into: software logging methods and hardware logging methods. The former executes log operations on the critical path of transaction execution by means of software, which will cause a large performance overhead. The latter executes log operations by means of hardware, so that log operations can be executed in parallel with transactions, thereby reducing the performance overhead caused by the log operations. However, the existing hardware logging methods fail to minimize the log overhead, may store redundant log data in the NVMMs, and may also introduce unnecessary ordering constraints between write operations.

SUMMARY OF THE INVENTION

In view of the defects and improvement requirements of the prior art, the present invention provides a method and system for ensuring the failure atomicity in a non-volatile memory, an objective of which is to reduce the overhead caused by ensuring the failure atomicity in the NVMM.

In order to achieve the above objective, according to one aspect of the present invention, there is provided a method for ensuring the failure atomicity in a non-volatile memory, comprising:

executing transactions encapsulated by one or more operations that need to ensure the failure atomicity in accordance with the following steps:

(S1) executing operations in a current transaction in sequence, for each write operation in the current transaction, if the oldest value of its corresponding data has not been saved into a log of the non-volatile memory, then creating an UndoRedo log entry for it, and if the oldest value of its corresponding data has been saved into the log of the non-volatile memory, then creating a Redo log entry for it;

wherein while log entries are created, the log entries are managed by using corresponding log management strategies according to types of log entries;

(S2) after all operations in the current transaction are executed, committing the current transaction; and (S3) completing the execution of the current transaction;

wherein information recorded in the UndoRedo log entries comprises: transaction number, write operation address, and oldest value and new value of corresponding data; information recorded in the Redo log entries comprises: transaction number, write operation address, and new value of corresponding data; and the oldest value of data is a value of the data when the current transaction just starts to be executed, and the new value of data is a value of the data after the execution of a corresponding write operation is completed.

In order to ensure the failure atomicity, the oldest value or new value of the data needs to be used when the transaction is recovered. In the present invention, when a write operation in a transaction is executed, a corresponding type of log entry is created according to the state of the data. For the data whose oldest value has not been saved to the log of the non-volatile memory, an UndoRedo log entry is created for it, and the transaction number, the write operation address, and the oldest value and new value of corresponding data are recorded in the log entry. For the data whose oldest value has been saved into the log of the non-volatile memory, a Redo log entry is created for it, and only the transaction number, the write operation address, and the new value of the corresponding data are recorded in the log entry. Thus, redundant log data can be avoided while ensuring the failure atomicity, so that the write operations to the NVMM can be reduced when the log entries are written back, thereby reducing performance and energy consumption overhead caused by ensuring the failure atomicity in the NVMM.

Further, an active log cache and a lazy log cache are added in a processor of the non-volatile memory; and the log management strategies comprise: active write-back strategies and lazy write-back strategies; and in step (S1), an active write-back strategy is used to manage the UndoRedo log entries, and a lazy write-back strategy is used to manage the Redo log entries;

wherein using the active write-back strategy to manage the UndoRedo log entries comprises: after an UndoRedo log entry is created, it being first cached in the active log cache, and then written back to the non-volatile memory after a preset time interval; and the time interval is less than the time required for the data to be written from a first-level cache of the processor back to the non-volatile memory; and using the lazy write-back strategy to manage the Redo log entries comprises: after a Redo log entry is created, it being first cached in the first-level cache of the processor, and when a cache line where the Redo log entry is located is evicted or updated by other transactions, the Redo log entry being cached in the lazy log cache; and when the lazy log cache is full, the Redo log entry in the lazy log cache being written back to the non-volatile memory; and log entries with the same transaction number and write operation address will be merged by the lazy write-back strategy during managing the Redo log entries.

In the present invention, the active write-back strategy is used to manage the UndoRedo log entries, which enables the oldest value of data to be persisted to the NVMM in time, thereby ensuring that the oldest value of the data in the UndoRedo log entries can always be used after the system failure, and the data in the NVMM can be recovered to the state before the interrupted transaction starts. In the present invention, the lazy write-back strategy is used to manage the Redo log entries, which enables the log entries with the same transaction number and write operation address in the cache to be merged as much as possible, thereby reducing the write operations to the NVMM, and further reducing the performance and power consumption overhead caused by the write operations. In general, in the present invention, the active write-back strategy is used to manage the UndoRedo log entries, and the lazy write-back strategy is used to manage the Redo log entries, which can reduce the write operations to the NVMM while ensuring the failure atomicity, thereby reducing the performance and power consumption overhead caused by the write operations.

Further, log entries with the same transaction number and write operation address will be merged by the active write-back strategy during managing the UndoRedo log entries.

In the present invention, the log entries with the same transaction number and write operation address are also merged during managing the UndoRedo log entries, which can further reduce the write operations to the NVMM.

Further, the log entry in the active log cache or lazy log cache being written back to the non-volatile memory comprises:

using a plurality of different encoding strategies suitable for the non-volatile memory in parallel to encode the log entry to be written to the non-volatile memory, and then selecting an encoding result with the smallest write overhead to write to the non-volatile memory.

In the present invention, different encoding strategies are used in parallel for encoding, and the encoding strategy with the smallest write overhead is selected, which can effectively reduce the overhead caused by the write operations while avoiding the delay caused by repeatedly trying different encoding strategies.

Further, the encoding strategy used when the log entry in the active log cache or the lazy log cache is written back to the non-volatile memory comprises a differential log data compression strategy;

a method for the differential log data compression strategy to execute encoding: discarding a part of the data value that has not changed before and after update of the write operation corresponding to the log entry, then compressing the remaining parts, and using a compression result as an encoding result of the log entry.

In the present invention, when the log entry is written back to the NVMM, one of the used encoding strategies is the differential log data compression strategy, and thus the characteristics of the log data can be fully utilized, further preventing the redundant log data from being written into the NVMM, so that the performance and power consumption overhead caused by the write operations can be reduced.

Further, in step (S2), committing the current transaction comprises:

(S21) according to system settings, determining whether the persistence of the transaction needs to be ensured when the transaction is committed, if the persistence of the transaction needs to be ensured, then going to step (S22); and if the persistence of the transaction does not need to be ensured, then going to step (S23);

(S22) writing all log entries belonging to the current transaction in the active log cache, the lazy log cache, and the first-level cache of the processor back to the non-volatile memory; and (S23) after creating a commit record of the current transaction, writing the commit record of the current transaction in a log area of the non-volatile memory;

wherein information recorded in the commit record comprises: transaction number, log entry count, and ULog count; the log entry count is the number of log entries whose current transaction is located in the active log cache, the lazy log cache, and the non-volatile memory when the commit record is created; the ULog count is the number of pieces of data belonging to the current transaction and being in a ULog state in the first-level cache when the commit record is created, and the ULog state indicates that the data has been updated by the current transaction, and the oldest value of the data is saved into the log of the non-volatile memory, whereas the new value of the data is not saved into the log of the non-volatile memory.

In the present invention, when committing a transaction, the transaction is allowed to be directly committed before being persisted, which avoids waiting for the transaction to persist on the critical path of transaction commit, thereby further reducing the overhead caused by ensuring the failure atomicity.

Further, the method for ensuring the failure atomicity in the non-volatile memory provided by the present invention further comprises:

executing transaction recovery in accordance with the following steps:

(R1) according to system settings, determining whether the persistence of the transaction needs to be ensured when the transaction is committed, if the persistence of the transaction needs to be ensured, then going to step (R2); and if the persistence of the transaction does not need to be ensured, then going to step (R4);

(R2) scanning the log area of the non-volatile memory from beginning to end to obtain the commit record of the transaction to be recovered, and the log entries belonging to each transaction in the log area of the non-volatile memory; and for any one transaction to be recovered, if the number of log entries belonging to the transaction in the log area of the non-volatile memory is equal to the log entry count in its commit record, then determining that the transaction has been committed, otherwise determining that the transaction is not committed;

(R3) correspondingly copying the new value of the data in the log entry of the transaction that has been committed to a location where the write operation address is recorded, and correspondingly copying the oldest value of the data in the UndoRedo log entry of the transaction that has not been committed to the location where the write operation address is recorded, and after the copying of the data is completed, going to step (R6);

(R4) scanning the log area of the non-volatile memory from beginning to end to obtain the commit record of the transaction to be recovered, and the log entries belonging to each transaction in the log area of the non-volatile memory, and for any one transaction to be recovered, if the number of log entries belonging to the transaction in the log area of the non-volatile memory is equal to the log entry count in its commit record, and the number of Redo log entries located after the transaction commit record is equal to the ULog count in its commit record, then determining that the transaction has been persisted, otherwise determining that none of the transaction and subsequent transactions has been persisted;

(R5) correspondingly copying the new value of the data in the log entry of the transaction that has been persisted to the location where the write operation address is recorded, and correspondingly copying the oldest value of the data in the UndoRedo log entry of the transaction that has not been persisted to the location where the write operation address is recorded; and (R6) deleting all log entries from the log area to end the recovery process.

According to another aspect of the present invention, there is provided a non-volatile memory system, comprising: a non-volatile memory and a processor;

wherein the processor comprises: one or more processor cores, a cache private to each processor core, a last-level cache shared by all processor cores, a cache controller, a log controller, and a memory controller;

the processor cores are used to execute operations in a current transaction in sequence during the execution of transactions;

the log controller is used to: during the execution of transactions, for each write operation in the current transaction, if the oldest value of its corresponding data has not been saved into a log of a non-volatile memory, then create an UndoRedo log entry for it, and if the oldest value of its corresponding data has been saved into the log of the non-volatile memory, then create a Redo log entry for it;

the log controller is further used to: while creating a log entry, manage the created log entry by using a corresponding log management strategy according to a type of the log entry;

the memory controller is used to send read and write operations to the non-volatile memory;

the cache private to each processor core is classified into a first-level cache to a Nth-level cache according to its storage structure; the caches private to the processor cores and the last-level cache shared by all processor cores are used to cache data required when the processor executes the operations; and the cache controller is used to control read and write of each cache; and wherein each transaction consists of one or more operations that need to ensure failure atomicity; information recorded in the UndoRedo log entries comprises: transaction number, write operation address, and oldest value and new value of corresponding data; information recorded in the Redo log entries comprises: transaction number, write operation address, and new value of corresponding data; the oldest value of data is a value of the data when the current transaction just starts to be executed, and the new value of data is a value of the data after the execution of a corresponding write operation is completed; and N is a positive integer.

Further, in the non-volatile memory system provided by the present invention, the processor further comprises: an active log cache and a lazy log cache; and the log controller uses an active write-back strategy to manage the UndoRedo log entries, and uses a lazy write-back strategy to manage the Redo log entries;

wherein the log controller using the active write-back strategy to manage the UndoRedo log entries comprises: after an UndoRedo log entry is created, it being first cached in the active log cache, and then written back to the non-volatile memory after a preset time interval; the time interval being less than the time required for the data to be written from the first-level cache of the processor back to the non-volatile memory; and the log controller using the lazy write-back strategy to manage the Redo log entries comprises: after a Redo log entry is created, it being first cached in the first-level cache, and when a cache line where the Redo log entry is located is evicted or updated by other transactions, the Redo log entry being cached by the memory controller in the lazy log cache; when the lazy log cache is full, the Redo log entry in the lazy log cache being written back to the non-volatile memory; and the log controller using the lazy write-back strategy to merge log entries with the same transaction number and write operation address during managing the Redo log entries.

Further, in the non-volatile memory system provided by the present invention, the non-volatile memory comprises: an NVMM controller and an NVMM array; the NVMM controller is used to process read and write operations sent by the memory controller, and the NVMM array is used to store data;

the NVMM controller comprises a plurality of encoders and corresponding decoders, and each encoder is used to implement an encoding strategy suitable for the non-volatile memory; and after receiving the write operation sent by the memory controller to write the log entry back to the non-volatile memory, a method for processing the request by the NVMM controller comprises: using the plurality of encoders in parallel to encode the log entry to be written to the non-volatile memory, and then selecting and writing an encoding result with the least write overhead to the NVMM array.

In general, through the above technical solutions conceived by the present invention, the following beneficial effects can be achieved:

(1) In the present invention, for the data whose oldest value has not been saved to the log of the non-volatile memory, an UndoRedo log entry is created for it, and the transaction number, the write operation address, and the oldest value and new value of corresponding data are recorded in the log entry. For the data whose oldest value has been saved in the log of the non-volatile memory, a Redo log entry is created for it, and only the transaction number, the write operation address, and the new value of the corresponding data are recorded in the log entry. Thus, redundant log data can be avoided while ensuring the failure atomicity, so that write operations to the NVMM can be reduced when log entries are written back, thereby reducing performance and energy consumption overhead caused by ensuring the failure atomicity in the NVMM.

(2) In the present invention, the active write-back strategy is used to manage the UndoRedo log entries, and the lazy write-back strategy is used to manage the Redo log entries, which can reduce the write operations to the NVMM while ensuring the failure atomicity, thereby reducing the performance and power consumption overhead caused by the write operations.

(3) In the present invention, different encoding strategies are used in parallel for encoding, and the encoding strategy with the smallest write overhead is selected, which can effectively reduce the overhead caused by the write operations while avoiding the delay caused by repeatedly trying different encoding strategies.

(4) In the present invention, when the log entry is written back to the NVMM, one of the used encoding strategies is the differential log data compression strategy, and thus the characteristics of the log data can be fully utilized, further preventing the redundant log data from being written into the NVMM, so that the performance and power consumption overhead caused by the write operations can be reduced.

(5) In the present invention, when committing a transaction, the transaction is allowed to be directly committed before being persisted, which avoids waiting for the transaction to persist on the critical path of transaction commit, thereby further reducing the overhead caused by ensuring the failure atomicity.

DETAILED DESCRIPTION OF THE PREFERRED EMBODIMENTS

In order to make the objectives, technical solutions and advantages of the present invention clearer, the present invention will be further described in detail below in conjunction with the accompanying drawings and embodiments. It should be understood that specific embodiments described herein are only used to explain the present invention and are not used to limit the present invention. In addition, the technical features involved in various implementations of the present invention described below can be combined with each other as long as they do not conflict with each other.

In the present invention, the terms "first," "second," etc. (if present) in the present invention and the accompanying drawings are used to distinguish similar objects, and are not necessarily used to describe a specific order or sequence.

In order to reduce the overhead caused by ensuring the failure atomicity in the NVMM, the present invention provides a method and system for ensuring the failure atomicity in the non-volatile memory. Its basic idea is as follows: the characteristics of the log data can be fully utilized; different types of log entries are created for data in different states to minimize redundant data in log data; different log management strategies are correspondingly used to manage the created log entries; and at the same time, when the log entries are written back to the NVMM, during the encoding process, the part of the data value that has not changed before and after the data update is discarded, so as to further reduce the write operations to the NVMM.

During the execution of transactions, the data corresponding to a certain write operation may have 4 states, which are represented by Clean, Dirty, URLog and ULog, respectively. The Clean state indicates that the data has not been updated by the current transaction. The Dirty state indicates that the data has been updated by the current transaction, and neither the oldest value nor the new value is saved into the log of the NVMM. The URLog state indicates that the data has been updated by the current transaction, and both the oldest and new values are saved into the log of the NVMM. The ULog state indicates that the data has been updated by the current transaction, and the oldest value is saved into the log of the NVMM, whereas the new value is not saved into the log of the NVMM. The oldest value of the data is the value of the data when the current transaction just starts to be executed, and the new value of the data is the value of the data after the execution of the corresponding write operation is completed.

Figure 1:
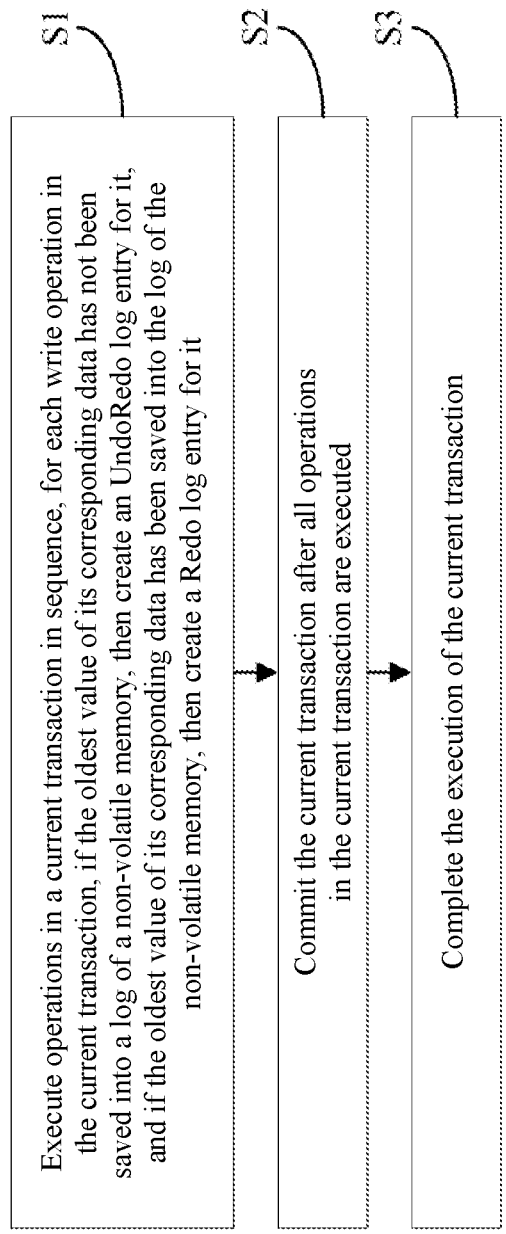
FIG. 1 is a flowchart of a method for ensuring the failure atomicity in a nonvolatile memory provided in an embodiment of the present invention.

In one embodiment of the present invention, there is provided a method for ensuring the failure atomicity in a non-volatile memory. The method comprises:

as shown in FIG. 1, executing transactions encapsulated by one or more operations that need to ensure the failure atomicity in accordance with the following steps:

(S1) executing operations in a current transaction in sequence, for each write operation in the current transaction, if the oldest value of its corresponding data has not been saved into a log of the non-volatile memory, then creating an UndoRedo log entry for it, and if the oldest value of its corresponding data has been saved into the log of the non-volatile memory, then creating a Redo log entry for it;

wherein while log entries are created, the log entries are managed by using corresponding log management strategies according to types of log entries;

on the basis of the above analysis about the data state, it can be known that in this embodiment, UndoRedo log entries are created for data in the Clean and Dirty states, and Redo log entries are created for data in the URLog and ULog states; and wherein information recorded in the UndoRedo log entries comprises: transaction number, write operation address, oldest value and new value of corresponding data; information recorded in the Redo log entries comprises: transaction number, write operation address and new value of the corresponding data; and for a write operation whose oldest value of data has been saved into the NVMM, the Redo log entry created for it in this embodiment does not record the oldest value of the redundant data, so the write operations to the NVMM can be reduced when the log entry is written back;

(S2) after all operations in the current transaction are executed, committing the current transaction; and (S3) completing the execution of the current transaction.

In order to further reduce the write operations to the NVMM, in this embodiment, an active log cache and a lazy log cache are added in a processor of the non-volatile memory.

the log management strategies comprise: active write-back strategies and lazy write-back strategies; and in step (S1), an active write-back strategy is used to manage the UndoRedo log entries, and a lazy write-back strategy is used to manage the Redo log entries;

Using the active write-back strategy to manage UndoRedo log entries comprises: after an UndoRedo log entry is created, it being first cached in the active log cache, and then written back to the non-volatile memory after a preset time interval. The time interval is less than the time required for data to be written from a first-level cache of the processor back to the non-volatile memory, thus ensuring that the log entry has been persisted before data. Using the active write-back strategy to manage UndoRedo log entries enables the oldest value of the data to be persisted in time to the NVMM, thereby ensuring that the oldest value of the data in the UndoRedo log entry can always be used after the system failure to recover the data in NVMM to the state before the interrupted transaction starts. The interrupted transaction here refers to a transaction that is forced to stop execution due to system failure during the execution process.

Using the lazy write-back strategy to manage the Redo log entries comprises: after a Redo log entry is created, it being first cached in the first-level cache of the processor, and when a cache line where the Redo log entry is located is evicted or updated by other transactions, the Redo log entry being cached in the lazy log cache; and when the lazy log cache is full, the Redo log entry in the lazy log cache being written back to the non-volatile memory. The log entries with the same transaction number and write operation address will be merged by the lazy write-back strategy during managing the Redo log entries. Using the lazy write-back strategy to manage Redo log entries enables the log entries with the same transaction number and write operation address in the cache to be merged as much as possible, thereby reducing the write operations to the NVMM, and further reducing the performance and power consumption overhead caused by the write operations.

In addition, the log entries with the same transaction number and write operation address may also be merged by the active write-back strategy during managing the UndoRedo log entries to reduce the write operations to the NVMM.

In this embodiment, a First Input First Output (FIFO) structure is used to implement the active log cache and the lazy log cache, so as to ensure that log entries are written back to the NVMM in the correct order.

In this embodiment, the log entry in the active log cache or the lazy log cache being written back to the non-volatile memory comprises:

using a plurality of different encoding strategies suitable for the non-volatile memory in parallel to encode the log entry to be written to the non-volatile memory, and then selecting an encoding result with the smallest write overhead to write to the non-volatile memory.

Any encoding strategy suitable for the non-volatile memory, such as Frequent Pattern Compression (FPC) strategy, etc., can be used in this embodiment. In order to further reduce the write operations to the NVMM, a new encoding strategy called the differential log data compression strategy is further proposed in this embodiment. The encoding method of the differential log data compression strategy comprises: discarding a part of the data value that has not changed before and after the update of the write operation corresponding to the log entry, then compressing the remaining parts, and using the compression result as the encoding result of the log entry. Some data patterns may be predefined according to the characteristics of the log data, and the corresponding compression results may be formulated for the data patterns. During compression, the corresponding compression results are determined according to the data patterns matched by the remaining parts. Some specific data patterns and corresponding compression results are shown in Table 1:

In Table 1, symbol "→" in the compression example represents compression, the left side of the "→" symbol is data matching the corresponding data pattern, and the right side of the "→" symbol is a corresponding compression result. Taking "0x00000000→0x0" as an example, it indicates that after the data 0x00000000 that matches the data pattern of all 0 s is compressed, the corresponding compression result is 0x0, and so on.

TABLE 1

| No. | Data pattern | Compression example |
| --- | --- | --- |
| 0 | All 0s | 0x00000000 → 0x0 |
| 1 | Sign extension of 2-bit data in each byte | 0x01F20101 → 0x65 |
| 2 | Sign extension of 4-bit data in each byte | 0x03F905FE → 0x395E |
| 3 | Sign extension of 1-byte data | 0xFFFFFF80 → 0x80 |
| 4 | Sign extension of 2-byte data | 0x00007FFF → 0x7FFF |
| 5 | Sign extension of 4-byte data | 0xFF80000000 → 0x80000000 |
| 6 | Lower 4 bits of each byte are 0 | 0x10203040 → 0x1234 |
| 7 | 1 byte starting from the least significant bit is 0 | 0x1234567800 → 0x12345678 |

It should be noted that the compression method here, as well as the data patterns and corresponding compression results shown in Table 1, are only exemplary descriptions, and should not be construed as the only limitation of the present invention.

In this embodiment, different encoding strategies are used in parallel for encoding, and the encoding strategy with the smallest write overhead is selected, which can effectively reduce the overhead caused by the write operations while avoiding the delay caused by repeatedly trying different encoding strategies. It should be noted that the method of using multiple encoding strategies in parallel for encoding here is only a preferred embodiment of the present invention, and should not be construed as the only limitation of the present invention. In other embodiments, only any encoding strategy may also be used for encoding.

Figure 2:
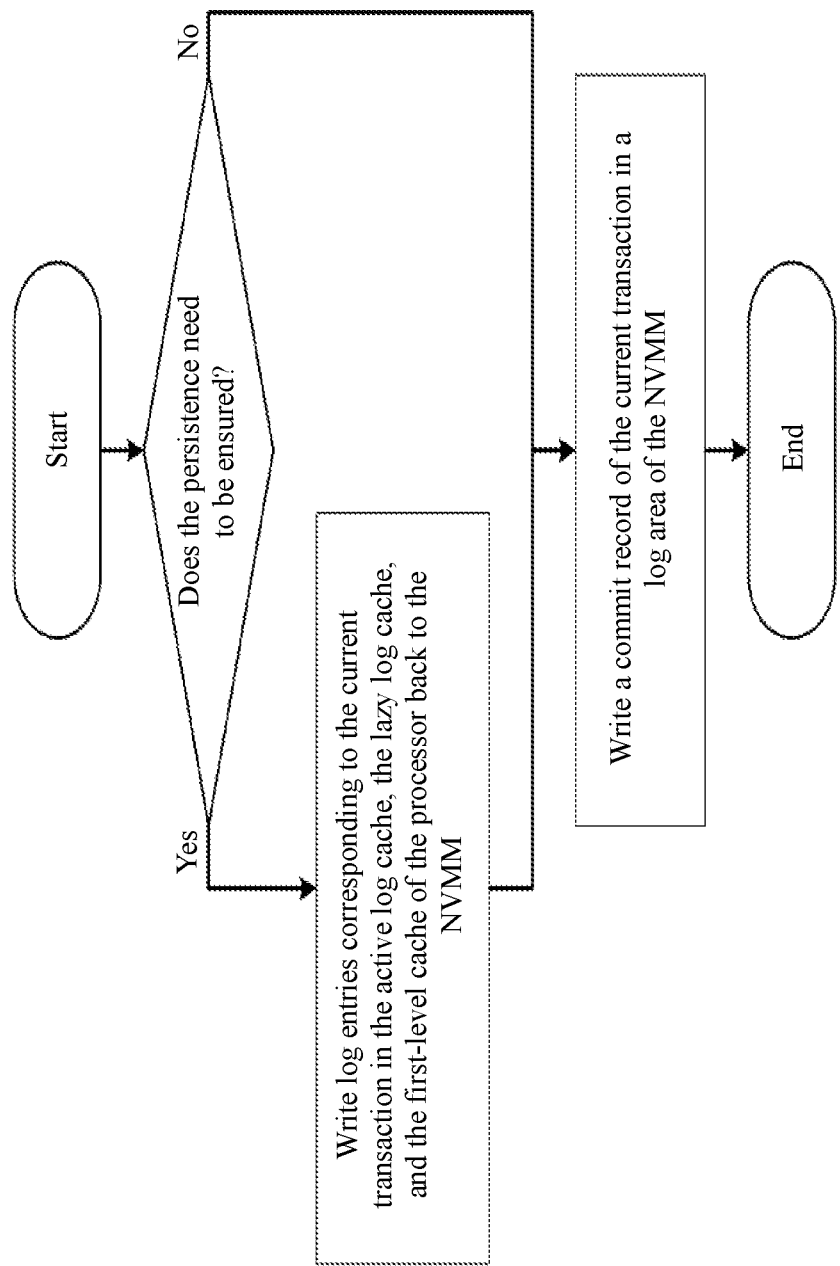
FIG. 2 is a flow chart of transaction commit provided in an embodiment of the present invention.

In this embodiment, in step (S2), committing the current transaction, as shown in FIG. 2, comprises:

(S21) according to system settings, determining whether the persistence of the transaction needs to be ensured when the transaction is committed, if the persistence of the transaction needs to be ensured, then going to step (S22); and if the persistence of the transaction does not need to be ensured, then going to step (S23);

(S22) writing all log entries belonging to the current transaction in the active log cache, the lazy log cache, and the first-level cache of the processor back to the non-volatile memory; and (S23) after creating a commit record of the current transaction, writing the commit record of the current transaction in a log area of the non-volatile memory;

wherein information recorded in the commit record comprises: transaction number, log entry count, and ULog count; the log entry count is the number of log entries whose current transaction is located in the active log cache, the lazy log cache, and the non-volatile memory when the commit record is created; the ULog count is the number of pieces of data belonging to the current transaction and being in a ULog state in the first-level cache when the commit record is created, and the ULog state indicates that the data has been updated by the current transaction, and the oldest value of the data is saved into the log of the non-volatile memory, whereas the new value of the data is not saved into the log of the non-volatile memory. In this embodiment, when committing a transaction, the transaction is allowed to be directly committed before being persisted, which avoids waiting for the transaction to persist on the critical path of transaction commit, thereby further reducing the overhead caused by ensuring the failure atomicity.

Figure 3:
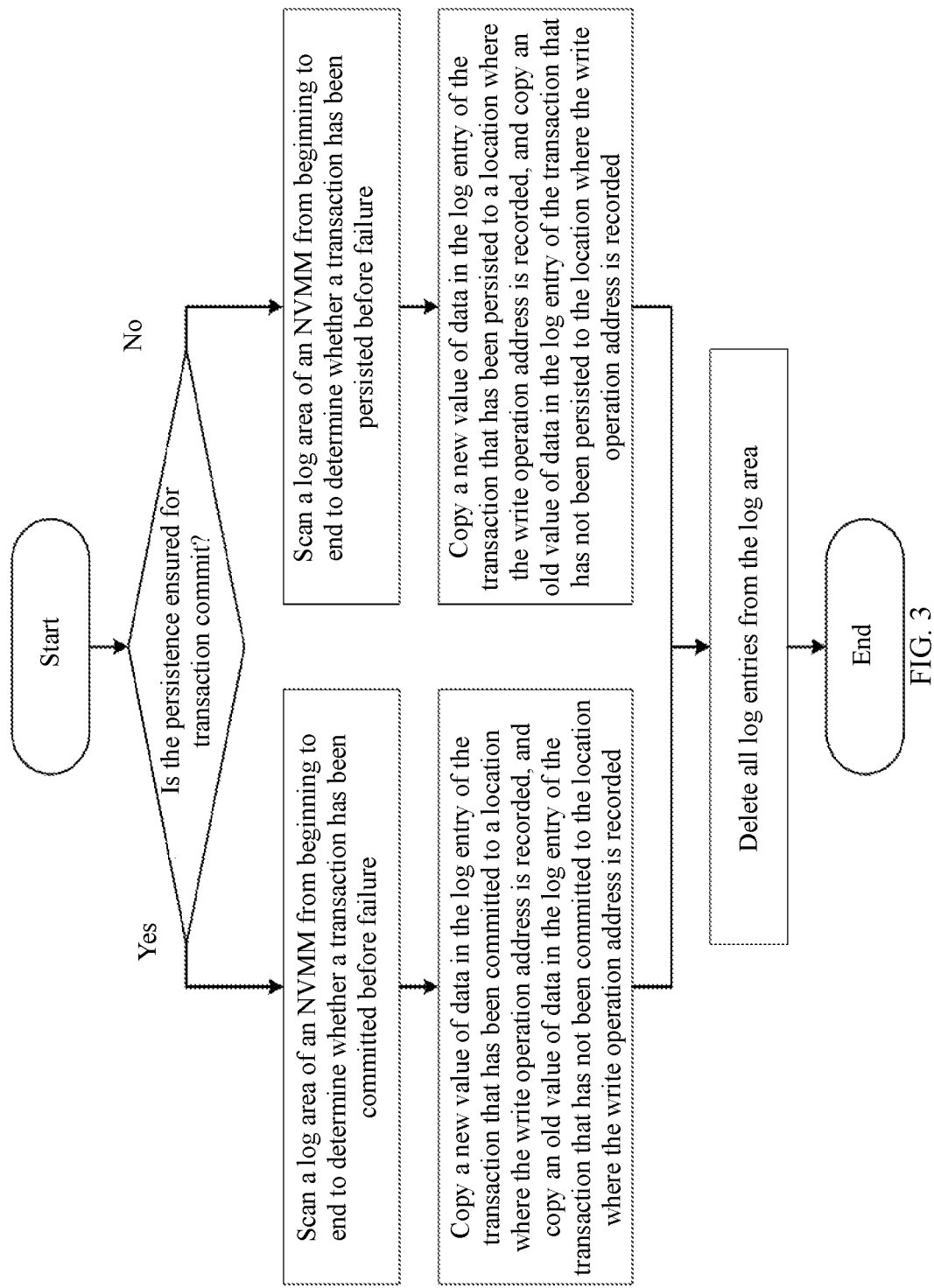
FIG. 3 is a flowchart of transaction recovery after a system failure provided in an embodiment of the present invention.

The method for ensuring the failure atomicity in the non-volatile memory provided in this embodiment further comprises:

as shown in FIG. 3, executing transaction recovery in accordance with the following steps:

(R1) according to system settings, determining whether the persistence of the transaction needs to be ensured when the transaction is committed, if the persistence of the transaction needs to be ensured, then going to step (R2); and if the persistence of the transaction does not need to be ensured, then going to step (R4);

(R2) scanning the log area of the non-volatile memory from beginning to end to obtain the commit record of the transaction to be recovered, and the log entries belonging to each transaction in the log area of the non-volatile memory; and for any one transaction to be recovered, if the number of log entries belonging to the transaction in the log area of the non-volatile memory is equal to the log entry count in its commit record, then determining that the transaction has been committed, otherwise determining that the transaction is not committed;

(R3) correspondingly copying the new value of the data in the log entry of the transaction that has been committed to a location where the write operation address is recorded, and correspondingly copying the oldest value of the data in the UndoRedo log entry of the transaction that has not been committed to the location where the write operation address is recorded, which thus enables the transactions that have been committed to be recovered to the state where the transactions have been completely updated, achieving the roll forward of these transactions, and at the same time, enables the transactions that have not been committed to be recovered to the state where the transactions have not been updated, achieving the rollback of these transactions;

after the copying of the data is completed, going to step (R6);

(R4) scanning the log area of the non-volatile memory from beginning to end to obtain the commit record of the transaction to be recovered, and the log entries belonging to each transaction in the log area of the non-volatile memory, and for any one transaction to be recovered, if the number of log entries belonging to the transaction in the log area of the non-volatile memory is equal to the log entry count in its commit record, and the number of Redo log entries located after the transaction commit record is equal to the ULog count in its commit record, then determining that the transaction has been persisted, otherwise determining that none of the transaction and subsequent transactions has been persisted;

(R5) correspondingly copying the new value of the data in the log entry of the transaction that has been persisted to the location where the write operation address is recorded, and correspondingly copying the oldest value of the data in the UndoRedo log entry of the transaction that has not been persisted to the location where the write operation address is recorded, which thus enables the transactions that have been persisted to be recovered to the state where the transactions have been completely updated, achieving the roll forward of these transactions, and at the same time, enables the transactions that have not been persisted to be recovered to the state where the transactions have not been updated, achieving the rollback of these transactions; and (R6) deleting all log entries from the log area to end the recovery process.

Figure 4:
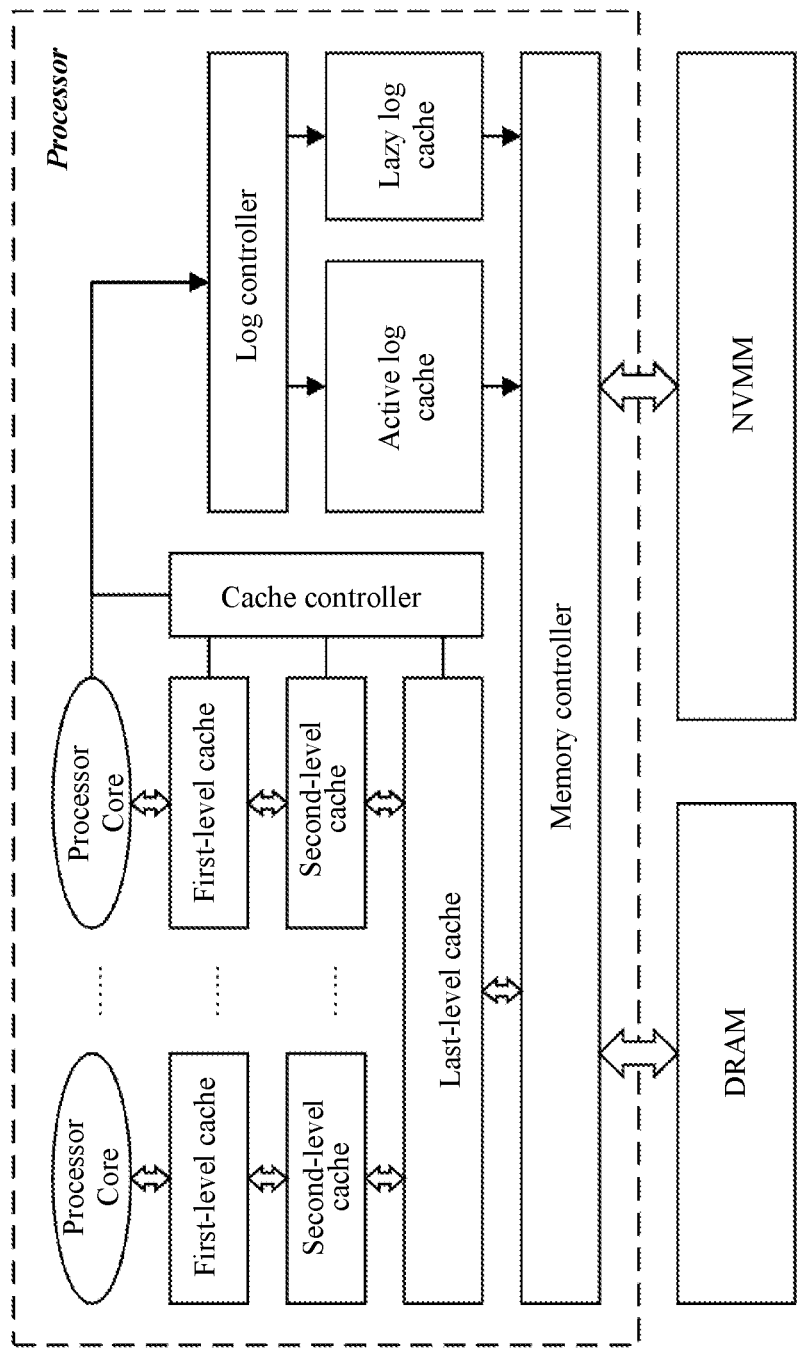
FIG. 4 is a schematic structural diagram of a processor for ensuring the failure atomicity in a nonvolatile memory provided in an embodiment of the present invention.

In another embodiment of the present invention, there is provided a non-volatile memory system. As shown in FIG. 4, the non-volatile memory system comprises a non-volatile memory and a processor;

the processor comprises: one or more processor cores, a cache private to each processor core, a last-level cache shared by all processor cores, a cache controller, a log controller, and a memory controller;

the processor cores are used to execute operations in a current transaction in sequence during the execution of transactions;

the log controller is used to: during the execution of transactions, for each write operation in the current transaction, if the oldest value of its corresponding data is not saved into a log of a non-volatile memory, then create an UndoRedo log entry for it, and if the oldest value of its corresponding data has been saved into the log of the non-volatile memory, then create a Redo log entry for it;

the log controller is further used to: while creating a log entry, manage the created log entry by using a corresponding log management strategy according to the type of the log entry;

the memory controller is used to send read and write operations to the non-volatile memory;

the cache private to each processor core is classified into a first-level cache to a Nth-level cache according to its storage structure; the caches private to the processor cores and the last-level cache shared by all processor cores are used to cache data required when the processor executes the operations; and the cache controller is used to control read and write of each cache.

Each transaction consists of one or more operations that need to ensure failure atomicity. Information recorded in the UndoRedo log entries comprises: transaction number, write operation address, and oldest value and new value of corresponding data. Information recorded in the Redo log entries comprises: transaction number, write operation address, and new value of corresponding data. N is a positive integer. As shown in FIG. 4, in this embodiment, N=2. Correspondingly, the private cache of each processor core comprises a first-level cache and a second-level cache.

In this embodiment, the log controller creates an UndoRedo log entry for each write operation that modifies data of the Clean and Dirty states within a transaction with a granularity of 8 bytes, and creates a Redo log entry for each write operation that modifies data of the URLog and ULog states. The UndoRedo log entry specifically comprises: 2-bit type flag, 16-bit transaction number, 8-bit thread number, 48-bit write operation address, 8-bit modification flag, 8-byte old value of data (before the write operation is updated), and 8-byte new value of data (after the write operation is updated). The Redo log entry specifically comprises: 2-bit type flag, 16-bit transaction number, 8-bit thread number, 48-bit write operation address, 8-bit modification flag, and 8-byte new value of data. The type flag is used to mark the type of the log entry, and the modification flag is used to mark which bytes in the data of the log entry have changed in value after the write operation is modified.

As shown in FIG. 2, in the non-volatile memory system provided in this embodiment, the processor further comprises an active log cache and a lazy log cache.

The log controller uses an active write-back strategy to manage the UndoRedo log entries, and uses a lazy write-back strategy to manage the Redo log entries;

wherein the log controller using the active write-back strategy to manage the UndoRedo log entries comprises: after an UndoRedo log entry is created, it being first cached in the active log cache, and then written back to the non-volatile memory after a preset time interval; the time interval being less than the time required for the data to be written from the first-level cache of the processor back to the non-volatile memory; and the log controller using the lazy write-back strategy to manage the Redo log entries comprises: after a Redo log entry is created, it being first cached in the first-level cache, and when a cache line where the Redo log entry is located is evicted or updated by other transactions, the Redo log entry being cached by the memory controller in the lazy log cache; when the lazy log cache is full, the Redo log entry in the lazy log cache being written back to the non-volatile memory; and the log controller using the lazy write-back strategy to merge log entries with the same transaction number and write operation address during managing the Redo log entries. In this embodiment, a 16-bit transaction number, an 8-bit thread number, a 16-bit state flag and 64-bit modification flag are added in the cache line of each first-level cache. The state flag is used to mark the state of each 8-byte data in the cache line, and the modification flag is used to mark which bytes in the data have changed in value after the write operation.

Similarly, the log controller may merge log entries with the same transaction number and write operation address during the process of using the active write-back strategy to manage the UndoRedo log entries.

In this embodiment, a First Input First Output (FIFO) structure is used to implement the active log cache and the lazy log cache, so as to ensure that log entries are written back to the NVMM in the correct order.

Figure 5:
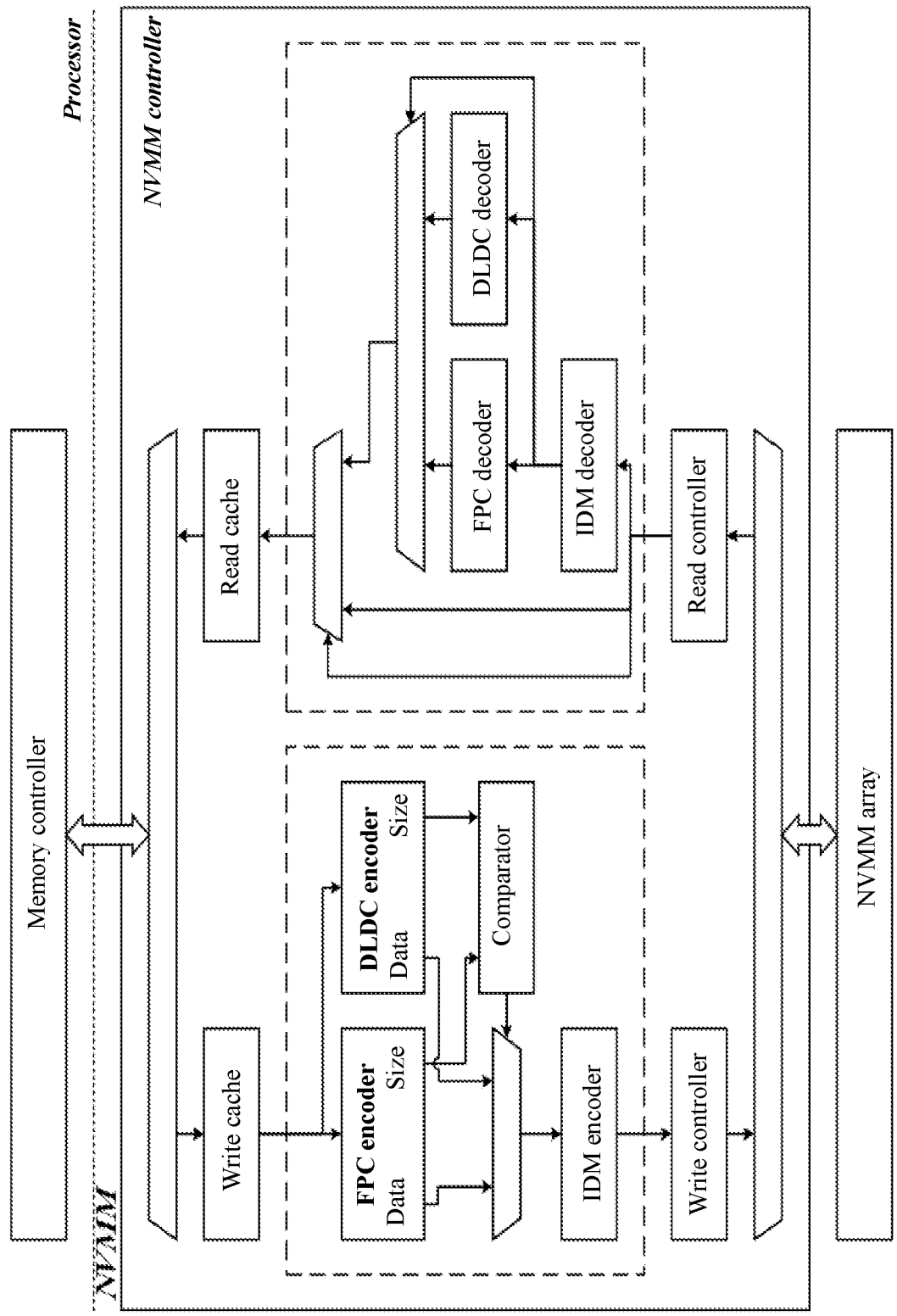
FIG. 5 is a schematic structural diagram of an NVMM controller provided in an embodiment of the present invention.

As shown in FIG. 5, in the non-volatile memory system provided in this embodiment, the non-volatile memory comprises an NVMM controller and an NVMM array. The NVMM controller is used to process read and write operations sent by the memory controller, and the NVMM array is used to store data.

The NVMM controller comprises a plurality of encoders and corresponding decoders. Each encoder is used to execute an encoding strategy suitable for the non-volatile memory. In this embodiment, the encoder specifically comprises an FPC encoder and a DLDC encoder. The FPC encoder is used to execute an existing Frequent Pattern Compression (FPC) strategy, and the DLDC encoder is used to execute a Differential Log Data Compression (DLDC) strategy. For the specific principle of the difference log data compression strategy, reference may be made to the description in the above method embodiment. Correspondingly, the decoder specifically comprises an FPC decoder and a DLDC decoder. The FPC decoder is used to decode the data compressed by the frequent pattern compression strategy, and the DLDC decoder is used to decode the data compressed by the difference log data compression strategy.

After receiving the write operation sent by the memory controller to write the log entry back to the non-volatile memory, a method for processing the request by the NVMM controller comprises: using the plurality of encoders in parallel to encode the log entry to be written to the non-volatile memory, and then selecting and writing an encoding result with the least write overhead to the NVMM array.

In order to implement the above encoding process, as shown in FIG. 5, the NVMM controller further comprises a conventional comparator and an IDM encoder. The comparator is used to compare the size of the data compressed by the FPC encoder and the DLDC encoder. The IDM encoder is used to select a suitable Incomplete Data Mapping (IDM) strategy according to the compression rate to map the data into low-write-overhead data. Correspondingly, the NVMM controller further comprises a conventional IDM decoder. The IDM decoder is used to decode the data encoded by the incomplete data mapping strategy.

Figure 6:
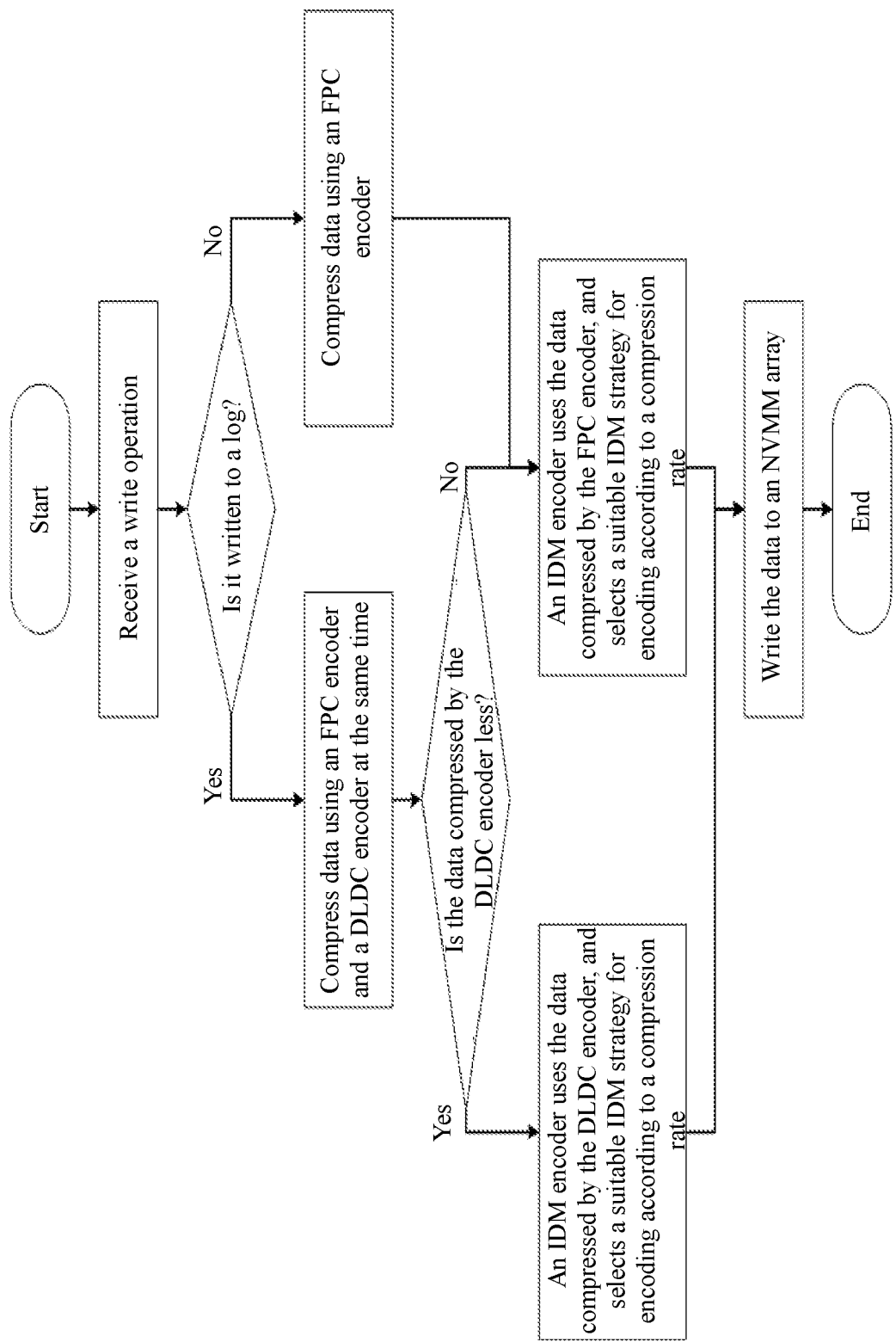
FIG. 6 is a flowchart of write operation processing in an NVMM controller provided in an embodiment of the present invention.

On the basis of the NVMM controller structure shown in FIG. 5, a process of the NVMM controller processing the write request sent by the memory controller is shown in FIG. 6. For a write operation of writing a log entry back to the non-volatile memory, the above-mentioned method is used for processing, namely, using the plurality of encoders in parallel to encode the log entry to be written to the non-volatile memory, and then selecting and writing an encoding result with the least write overhead to the NVMM array. For a write operation of writing data back to the non-volatile memory, the conventional encoding and writing methods are used for processing.

As shown in FIG. 5, the NVMM controller further comprises a conventional write cache, read cache, write controller and read controller. The write cache and read cache are used to cache data written to and read from the NVMM, and the write controller and read controller are used to control the read and write operations of the NVMM array.

It would be easily understood by a person skilled in the art that the preferred embodiments of the present invention are only described as above, but are not used to limit the present invention, and any modifications, equivalent replacements and improvements within the spirit and principle of the present invention should be covered within the scope of protection of the present invention.

The invention claimed is:

1. A method for ensuring failure atomicity in a non-volatile memory, the method comprising:
   executing transactions encapsulated by one or more operations that need to ensure the failure atomicity in accordance with the following steps:
   (S1) executing operations in a current transaction in sequence, for each write operation in the current transaction, if the oldest value of its corresponding data has not been saved into a log of the non-volatile memory, then creating an UndoRedo log entry for it, and if the oldest value of its corresponding data has been saved into the log of the non-volatile memory, then creating a Redo log entry for it;
   wherein while log entries are created, the log entries are managed by using corresponding log management strategies according to types of log entries;
   (S2) after all operations in the current transaction are executed, committing the current transaction; and
   (S3) completing the execution of the current transaction;
   wherein information recorded in the UndoRedo log entries comprises: transaction number, write operation address, and oldest value and new value of corresponding data;
   information recorded in the Redo log entries comprises: transaction number, write operation address, and new value of corresponding data; and the oldest value of data is a value of the data when the current transaction just starts to be executed, and the new value of data is a value of the data after the execution of a corresponding write operation is completed;
   wherein an active log cache and a lazy log cache are added in a processor of the non-volatile memory; and
   the log management strategies comprise: active write-back strategies and lazy write-back strategies; and in the step (S1), an active write-back strategy is used to manage the UndoRedo log entries, and a lazy write-back strategy is used to manage the Redo log entries;
   wherein using the active write-back strategy to manage the UndoRedo log entries comprises: after an UndoRedo log entry is created, it being first cached in the active log cache, and then written back to the non-volatile memory after a preset time interval; and the time interval is less than the time required for the data to be written from a first-level cache of the processor back to the non-volatile memory; and
   using the lazy write-back strategy to manage the Redo log entries comprises: after a Redo log entry is created, it being first cached in the first-level cache of the processor, and when a cache line where the Redo log entry is located is evicted or updated by other transactions, the Redo log entry being cached in the lazy log cache; and when the lazy log cache is full, the Redo log entry in the lazy log cache being written back to the non-volatile memory; and log entries with the same transaction number and write operation address will be merged by the lazy write-back strategy during managing the Redo log entries.

2. The method for ensuring the failure atomicity in the non-volatile memory as claimed in claim 1, wherein log entries with the same transaction number and write operation address will be merged by the active write-back strategy during managing the UndoRedo log entries.

3. The method for ensuring the failure atomicity in the non-volatile memory as claimed in claim 1, wherein the log entry in the active log cache or lazy log cache being written back to the non-volatile memory comprises: using a plurality of different encoding strategies suitable for the non-volatile memory in parallel to encode the log entry to be written to the non-volatile memory, and then selecting an encoding result with the smallest write overhead to write to the non-volatile memory.

4. The method for ensuring the failure atomicity in the non-volatile memory as claimed in claim 1, wherein the encoding strategy used when the log entry in the active log cache or the lazy log cache is written back to the non-volatile memory comprises a differential log data compression strategy; and
   a method for the differential log data compression strategy to execute encoding comprises: discarding a part of the data value that has not changed before and after update of the write operation corresponding to the log entry, then compressing the remaining parts, and using a compression result as an encoding result of the log entry.

5. The method for ensuring the failure atomicity in the non-volatile memory as claimed in claim 1, wherein in the step (S2), committing the current transaction comprises:
   (S21) according to system settings, determining whether the persistence of the transaction needs to be ensured when the transaction is committed, if the persistence of the transaction needs to be ensured, then going to step (S22); and if the persistence of the transaction does not need to be ensured, then going to step (S23);
   (S22) writing all log entries belonging to the current transaction in the active log cache, the lazy log cache, and the first-level cache of the processor back to the non-volatile memory; and
   (S23) after creating a commit record of the current transaction, writing the commit record of the current transaction in a log area of the non-volatile memory;
   wherein information recorded in the commit record comprises: transaction number, log entry count, and ULog count; the log entry count is the number of log entries whose current transaction is located in the active log cache, the lazy log cache, and the non-volatile memory when the commit record is created; the ULog count is the number of pieces of data belonging to the current transaction and being in a ULog state in the first-level cache when the commit record is created, and the ULog state indicates that the data has been updated by the current transaction, and the oldest value of the data is saved into the log of the non-volatile memory, whereas the new value of the data is not saved into the log of the non-volatile memory.

6. The method for ensuring the failure atomicity in the non-volatile memory as claimed in claim 5, wherein the method further comprises:
   executing transaction recovery in accordance with the following steps:
   (R1) according to system settings, determining whether the persistence of the transaction needs to be ensured when the transaction is committed, if the persistence of the transaction needs to be ensured, then going to step (R2); and if the persistence of the transaction does not need to be ensured, then going to step (R4);
   (R2) scanning the log area of the non-volatile memory from beginning to end to obtain the commit record of the transaction to be recovered, and the log entries belonging to each transaction in the log area of the non-volatile memory; and for any one transaction to be recovered, if the number of log entries belonging to the transaction in the log area of the non-volatile memory is equal to the log entry count in its commit record, then determining that the transaction has been committed, otherwise determining that the transaction is not committed;

(R3) correspondingly copying the new value of the data in the log entry of the transaction that has been committed to a location where the write operation address is recorded, and correspondingly copying the oldest value of the data in the UndoRedo log entry of the transaction that has not been committed to the location where the write operation address is recorded, and after the copying of the data is completed, going to step (R6);

(R4) scanning the log area of the non-volatile memory from beginning to end to obtain the commit record of the transaction to be recovered, and the log entries belonging to each transaction in the log area of the non-volatile memory, and for any one transaction to be recovered, if the number of log entries belonging to the transaction in the log area of the non-volatile memory is equal to the log entry count in its commit record, and the number of Redo log entries located after the transaction commit record is equal to the ULog count in its commit record, then determining that the transaction has been persisted, otherwise determining that none of the transaction and subsequent transactions has been persisted;

(R5) correspondingly copying the new value of the data in the log entry of the transaction that has been persisted to the location where the write operation address is recorded, and correspondingly copying the oldest value of the data in the UndoRedo log entry of the transaction that has not been persisted to the location where the write operation address is recorded; and (R6) deleting all log entries from the log area to end the recovery process.

7. A non-volatile memory system comprising: a non-volatile memory and a processor;

the processor comprises: one or more processor cores, a cache private to each processor core, a last-level cache shared by all processor cores, a cache controller, a log controller, and a memory controller;

the processor cores are used to execute operations in a current transaction in sequence during execution of transactions;

the log controller is used to: during the execution of transactions, for each write operation in the current transaction, if the oldest value of its corresponding data has not been saved into a log of a non-volatile memory, then create an UndoRedo log entry for it, and if the oldest value of its corresponding data has been saved into the log of the non-volatile memory, then create a Redo log entry for it;

the log controller is further used to: while creating a log entry, manage the created log entry by using a corresponding log management strategy according to the type of the log entry;

the memory controller is used to send read and write operations to the non-volatile memory; and the cache private to each processor core is classified into a first-level cache to a Nth-level cache according to its storage structure; the caches private to the processor cores and the last-level cache shared by all processor cores are used to cache data required when the processor executes the operations; and the cache controller is used to control read and write of each cache;

wherein each transaction consists of one or more operations that need to ensure failure atomicity; information recorded in the UndoRedo log entries comprises: transaction number, write operation address, and oldest value and new value of corresponding data; information recorded in the Redo log entries comprises: transaction number, write operation address, and new value of corresponding data; the oldest value of data is a value of the data when the current transaction just starts to be executed, and the new value of data is a value of the data after the execution of a corresponding write operation is completed; and N is a positive integer;

wherein the processor further comprises: an active log cache and a lazy log cache; and the log controller uses an active write-back strategy to manage the UndoRedo log entries, and uses a lazy write-back strategy to manage the Redo log entries;

wherein the log controller using the active write-back strategy to manage the UndoRedo log entries comprises: after an UndoRedo log entry is created, it being first cached in the active log cache, and then written back to the non-volatile memory after a preset time interval; and the time interval is less than the time required for the data to be written from the first-level cache of the processor back to the non-volatile memory; and the log controller using the lazy write-back strategy to manage the Redo log entries comprises: after a Redo log entry is created, it being first cached in the first-level cache, and when a cache line where the Redo log entry is located is evicted or updated by other transactions, the Redo log entry being cached by the memory controller in the lazy log cache; and when the lazy log cache is full, the Redo log entry in the lazy log cache being written back to the non-volatile memory; and the log controller will merge log entries with the same transaction number and write operation address using the lazy write-back strategy during managing the Redo log entries.

8. The non-volatile memory system as claimed in claim 7, wherein the non-volatile memory comprises: an NVMM controller and an NVMM array; and the NVMM controller is used to process read and write operations sent by the memory controller, and the NVMM array is used to store data;

the NVMM controller comprises a plurality of encoders and corresponding decoders, and each encoder is used to implement an encoding strategy suitable for the non-volatile memory; and after receiving the write operation sent by the memory controller to write the log entry back to the non-volatile memory, a method for processing the request by the NVMM controller comprises: using the plurality of encoders in parallel to encode the log entry to be written to the non-volatile memory, and then selecting and writing an encoding result with the least write overhead to the NVMM array.

* * * * *